United States Patent
Miller

(10) Patent No.: US 10,205,631 B1
(45) Date of Patent: Feb. 12, 2019

(54) DISTRIBUTING AN ACCESS CONTROL SERVICE TO LOCAL NODES

(71) Applicant: INTUIT INC., Mountain View, CA (US)

(72) Inventor: Michael T Miller, Sarasota, FL (US)

(73) Assignee: INTUIT INC., Mountain View, CA (US)

(*) Notice: Subject to any disclaimer, the term of this patent is extended or adjusted under 35 U.S.C. 154(b) by 374 days.

(21) Appl. No.: 14/929,096

(22) Filed: Oct. 30, 2015

(51) Int. Cl.
*G06F 15/16* (2006.01)
*H04L 12/24* (2006.01)
*H04L 29/08* (2006.01)

(52) U.S. Cl.
CPC ...... *H04L 41/0806* (2013.01); *H04L 67/1097* (2013.01); *H04L 67/306* (2013.01)

(58) Field of Classification Search
CPC .................................................. G06F 21/6209
USPC .......................................................... 709/225
See application file for complete search history.

(56) References Cited

U.S. PATENT DOCUMENTS

| | | | | |
|---|---|---|---|---|
| 5,889,952 A * | 3/1999 | Hunnicutt | ........... | G06F 21/6218 709/219 |
| 7,185,047 B1 * | 2/2007 | Bate | ........................ | H04L 63/08 709/202 |
| 8,156,538 B2 * | 4/2012 | Kanade | ................... | G06F 21/604 726/1 |
| 8,875,230 B1 * | 10/2014 | Weiner | ..................... | H04L 63/20 726/1 |
| 2002/0016790 A1 * | 2/2002 | Arnold | ................... | G06F 9/4411 |
| 2002/0138631 A1 * | 9/2002 | Friedel | .................. | H04L 63/102 709/229 |
| 2003/0110397 A1 * | 6/2003 | Supramaniam | ..... | G06F 21/6209 726/1 |
| 2004/0103202 A1 * | 5/2004 | Hildebrand | ......... | G06F 21/6209 709/229 |
| 2007/0056019 A1 * | 3/2007 | Allen | ................... | G06F 21/6236 726/1 |
| 2007/0288487 A1 * | 12/2007 | Song | ................... | H04L 12/2818 |
| 2009/0077086 A1 * | 3/2009 | Malkin | .................... | G06F 21/40 |
| 2009/0158384 A1 * | 6/2009 | Kanade | .................. | G06F 21/604 726/1 |
| 2009/0178107 A1 * | 7/2009 | Karjoth | ............. | G06F 17/30507 726/1 |
| 2009/0307742 A1 * | 12/2009 | Forster | .................. | G06F 21/604 726/1 |
| 2012/0036370 A1 * | 2/2012 | Lim | ...................... | H04L 9/0822 713/189 |
| 2012/0110632 A1 * | 5/2012 | Burghart | ............... | G06F 21/604 726/1 |
| 2012/0311674 A1 * | 12/2012 | Hockings | ............ | G06F 21/6218 726/4 |

(Continued)

*Primary Examiner* — Hamza N Algibhah
(74) *Attorney, Agent, or Firm* — Patterson + Sheridan, LLP

(57) ABSTRACT

One embodiment of the present invention provides a system for distributing an access control service to local nodes. During operation, the system receives, at a node in a network, a policy file comprising access policies for resources in the network, wherein the access policies are associated with attributes of profiles, and wherein the profiles are associated with clients. Next, the system compiles, at the node, the policy file into an optimized data structure. Finally, the system stores, at the node, the optimized data structure in memory to facilitate subsequent local lookups of permissions associated with the attributes and the resources.

20 Claims, 4 Drawing Sheets

(56) References Cited

U.S. PATENT DOCUMENTS

| | | | | |
|---|---|---|---|---|
| 2013/0291055 A1* | 10/2013 | Muppidi | ............... | H04W 12/08 |
| | | | | 726/1 |
| 2014/0071135 A1* | 3/2014 | Morsi | .................... | G06Q 10/10 |
| | | | | 345/440 |
| 2014/0143826 A1* | 5/2014 | Sharp | .................... | G06F 21/604 |
| | | | | 726/1 |
| 2014/0330553 A1* | 11/2014 | Aratsu | .................... | G06F 17/27 |
| | | | | 704/9 |
| 2015/0135258 A1* | 5/2015 | Smith | .................... | G06F 21/45 |
| | | | | 726/1 |
| 2015/0249852 A1* | 9/2015 | Tang | .................. | H04N 21/4753 |
| | | | | 725/28 |
| 2015/0350254 A1* | 12/2015 | Hendrick | ................ | H04L 63/20 |
| | | | | 726/1 |
| 2016/0366188 A1* | 12/2016 | Smith | .................... | H04L 63/101 |
| 2017/0031956 A1* | 2/2017 | Burk | ................ | G06F 17/30371 |
| 2017/0046892 A1* | 2/2017 | Masters | ............. | G07C 9/00103 |
| 2017/0116431 A1* | 4/2017 | Lee | .................... | G06F 21/6218 |

\* cited by examiner

DISTRIBUTING AN ACCESS CONTROL SERVICE TO LOCAL NODES

RELATED APPLICATION

The subject matter of this application is related to the subject matter in a co-pending non-provisional application by the same inventors as the instant application and filed on the same day as the instant application entitled, "Performing Enhanced Access Control Lookups," having Ser. No. 14/929,107, and filing date Oct. 30, 2015.

BACKGROUND

Related Art

The disclosed embodiments relate to techniques for managing access control for resources. More specifically, the disclosed embodiments relate to distributed access control service with advanced querying features.

Many platforms and systems exist for describing and processing access control rules for resources. One such framework, the eXtensible Access Control Markup Language (XACML) defines a declarative access control policy language implemented in XML and a processing model describing how to evaluate access requests according to the rules defined in policies. The XACML model supports and encourages the separation of the access decision from the point of use. When access decisions are coded into client applications (or based on local machine user IDs and Access Control Lists (ACLs)), it is very difficult to update the decision criteria when the governing policy changes. When the client is decoupled from the access decision, authorization policies can be updated on the fly and affect all clients immediately.

While XACML provides an improved framework for managing access control for resources, it is not without its shortcomings. For instance, in a typical XACML environment, a client would serialize an XML request for access to a particular resource, and forward the request to an access control server. The access control server would then deserialize the request, communicate with other services, such as a Lightweight Directory Access Protocol (LDAP) database, make a decision on the request for access to the particular resource, serialize the decision into an XML response, and forward the XML response back to the client.

As one can imagine, a single request consumes a fair amount of resources in both network traffic, and the serialization/deserialization of data. While this may be a trivial amount of resources for a single request, one can see how quickly this can become problematic in a system with millions of resources and very heavy access to those resources. Hence, what is needed is a method and an apparatus that facilitates access control for resources in a distributed system without the above-described problems.

SUMMARY

One embodiment of the present invention provides a system for distributing an access control service to local nodes. During operation, the system receives, at a node in a network, a policy file comprising access policies for resources in the network, wherein the access policies are associated with attributes of profiles, and wherein the profiles are associated with clients. Next, the system compiles, at the node, the policy file into an optimized data structure. Finally, the system stores, at the node, the optimized data structure in memory to facilitate subsequent local lookups of permissions associated with the attributes and the resources.

In some embodiments of the present invention, compiling the policy file into the optimized data structure involves compiling the policy file into a nested hash map.

In some embodiments of the present invention, the system receives a request from a particular client to perform a particular operation on a particular resource on the network. In response to the request, the system performs a lookup in the optimized data structure to determine if the particular client has permission to perform the particular operation on the particular resource on the network, wherein the lookup includes an identifier for the particular client, the particular operation, and the particular resource on the network. If so, the system allows the particular client to perform the particular operation on the particular resource on the network. However, if not, the system denies the request.

In some embodiments of the present invention, the system receives, at the node in a network, a second policy file. Next, the system compiles, at the node, the second policy file into a second optimized data structure. The system then stores, at the node, the second optimized data structure in memory. Finally, the system atomically swaps the optimized data structure with the second optimized data structure.

In some embodiments of the present invention, the second policy file is received at the node on a pre-determined schedule.

In some embodiments of the present invention, the second policy file is received at the node in response to a request for a new policy file from the node.

In some embodiments of the present invention, the second policy file is received at the node after a pre-determined amount of time.

In some embodiments of the present invention, the client is one of an application and an end-user.

In some embodiments of the present invention, the attributes are associated with edges in a node graph.

One embodiment of the present invention provides a system for performing enhanced access control lookups. During operation, the system receives, at a node in a network, a request from a particular client to perform a particular operation on a particular resource on the network. In response to the request, the system performs a lookup in an optimized data structure to determine a list of resources on which the particular client has permission to perform the particular operation, wherein the lookup includes an identifier for the particular client, and the particular operation. Next, the system determines, at the node, if the particular resource is a member of the list of resources on which the particular client has permission to perform the particular operation. If so, the system allows the particular client to perform the particular operation on the particular resource. However, if not, the system denies the request. Finally, the system stores in memory, at the node, the list of resources on which the particular client has permission to perform the particular operation to facilitate subsequent determinations without having to perform subsequent lookups.

In some embodiments of the present invention, the optimized data structure is a nested hash map.

In some embodiments of the present invention, performing the lookup in the optimized data structure to determine the list of resources on which the particular client has permission to perform the particular operation further involves the system performing a second lookup in the optimized data structure to determine a second list of resources on which all clients have permission to perform the particular operation. The system then creates a new list by performing a union of the the list of resources on which the particular client has permission to perform the particular operation and the second list of resources on which all clients have permission to perform the particular operation. Finally, the system replaces the list of resources on which the particular client has permission to perform the particular operation with the new list.

In some embodiments of the present invention, the particular operation is one of: a read operation, a write operation, and an administrator operation.

In some embodiments of the present invention, the particular operation is a soft-delete operation, wherein the soft-delete operation is an operation wherein a resource is marked as deleted and is subsequently invisible to a client that is not an administrator, and wherein the resource still persists on the network.

In some embodiments of the present invention, the particular operation is a hard-delete operation, wherein the hard-delete operation is an operation wherein a resource is removed from the network and no longer persists on the network.

In some embodiments of the present invention, the system queries a third party to determine if the particular resource is a member of the list of resources on which the particular client has permission to perform the particular operation.

BRIEF DESCRIPTION OF THE FIGURES

Table 1 illustrates a plain text policy file in EDN format in accordance with an embodiment of the present invention.

Table 2 illustrates a plain text optimized policy file prior to compiling in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
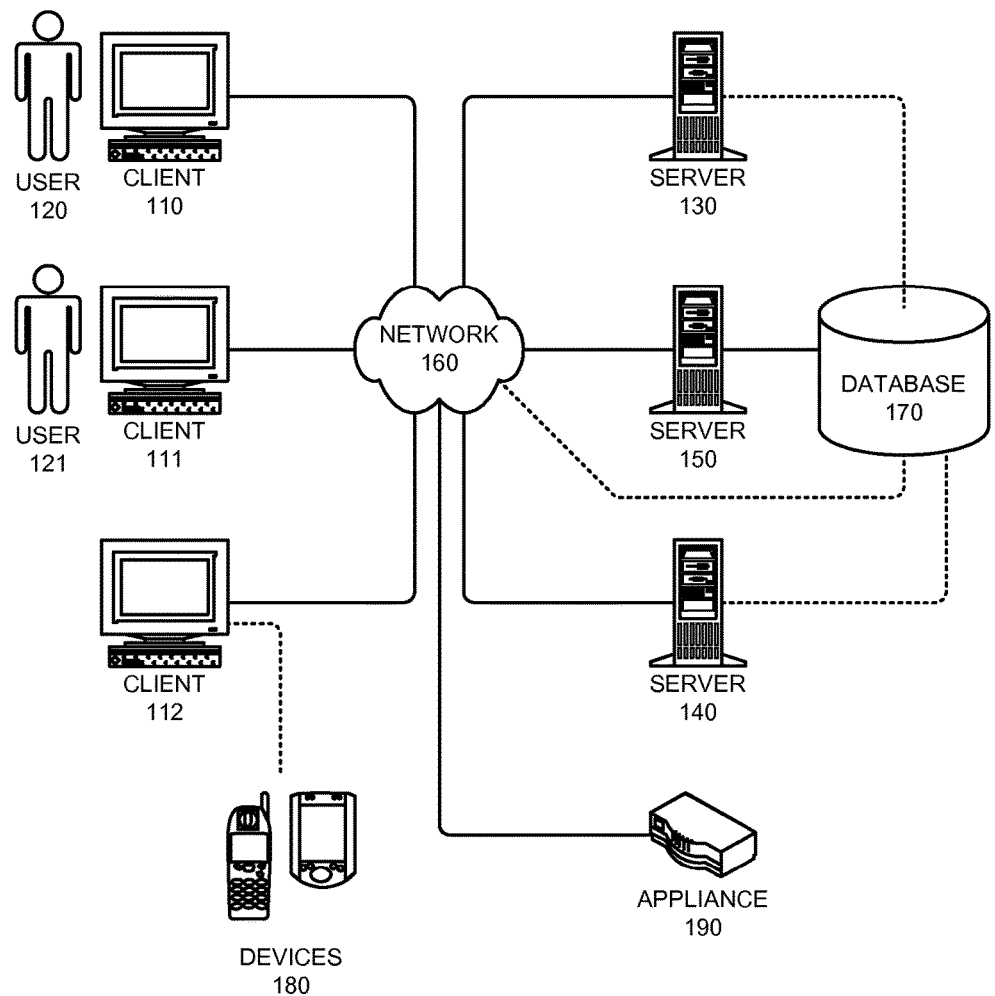
FIG. 1 illustrates a computing environment in accordance with an embodiment of the present invention.

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150. In some embodiments of the present invention, each server in servers 130-150 has its own optimized and compiled version of the policy file described below.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network. Some embodiments of the present invention enforce access control policies for resources in computing environment 100 for entities with profiles stored in database 170.

Profiles in database 170 may additionally be connected by a series of edges that denote directional relationships between pairs of entities. Each edge may have a label that defines the type of relationship, such as "customer of," "vendor of," "friends with," and/or "employee of." The edges may also be used to describe transactional relationships, such as "invoiced" or "reviewed." Each edge may include properties, which are key-value pairs that store atomic units of information associated with the edge. The key of a property may represent a name of a field in the edge that is implicitly qualified by the associated edge label. The value of a property may be a scalar or a vector of scalars of the same type, which represent multiple values of the property.

Consequently, profiles in database 170 may be used to construct a graph, with entities forming nodes in the graph and relationships of the entities forming edges in the graph. A profile service may provide capabilities for segmenting across profiles based on attributes of the profiles and properties of the edges in the profiles. For example, the profile service may allow clients 110-112 to retrieve profiles with specific attributes or ranges of attributes (e.g., uses a mobile phone, lives in California, has a phone number with area code "415," etc.), edges, edge properties, and/or ranges of edge properties (e.g., is a customer of 10 companies, is employed by a company with more than $1 million of annual revenue, has an accountant, etc.).

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

Exemplary Embodiment

Embodiments of the present invention provides a system for distributing an access control service to local nodes. During operation, the system receives, at a node in a network, a policy file comprising access policies for resources in the network, wherein the access policies are associated with attributes of profiles, and wherein the profiles are associated with clients. Note that this policy file is received in an un-compiled and un-optimized state. For example, see Table 1 below.

TABLE 1

```
;;    Sample policy file:
;;        (define all-actions ["read" "write" "schema_admin"])
;;        (rule "global-permissions"
;;            :permissions [{:namespaces ["global"]
;;                           :actions ["read"]}])
;;        (rule "test-rule-1"
;;            :asset-id "1234"
;;            :permissions [{:namespaces ["foo"
;;                                        "bar"]
;;                           :actions all-actions},
;;                          {:namespaces ["baz"
;;                                        "quux.foo.bar"
;;                                        "quux.foo.baz"]
;;                           :labels ["blargh"]
;;                           :actions ["read"]}])
```

Table 1 illustrates a plain text policy file in EDN format in accordance with an embodiment of the present invention. In the example in Table 1, all of the actions are defined that appear throughout the policy file. In this example, "read," "write," and "schema_admin" are the defined actions. Next, the policy file defines the access rules. In the example above, the policy file starts with the global permissions (the default permissions for all entities).

In this example, all of the attributes within the system are defined in a hierarchy of namespaces, with the "global" namespace covering all attributes. Thus, in the example above, all entities in the system have "read" access to all attributes by default. The policy file also defines additional access rules for specific entities or groups of entities. For example, under "test-rule-1," the entity with asset-id "1234" can perform all actions on attributes that are part of namespaces "foo" and "bar." It is important to note here that the entity with asset-id "1234" can be an application, an end-user, or any other entity defined within the network. In addition, the entity with asset-id "1234" can perform read actions on attributes that are part of namespaces "baz," "guux.foo.bar," and "guux.foo.baz." Note that while "namespaces" are collections of attributes, "labels" are edges in the node graph described previously.

Next, the system compiles, at the node, the policy file into an optimized data structure. This resulting structure is represented in Table 2. Table 2 illustrates a plain text optimized policy file prior to compiling in accordance with an embodiment of the present invention. Note that while the file represented by Table 2 would be compiled into a file of nested hash maps, it is presented here in plain text for illustrative purposes.

TABLE 2

```
;;        {:rules
;;            1234"
;;            {:permissions
;;                {"schema admin"
;;                    {:compiled-patterns
;;                        {:namespaces
;;                            #{#"bar|bar\. .*" #"foo|foo\..*"}},
;;                    :patterns
;;                        {:namespaces
;;                            #{"foo" "bar"}}},
;;                "write"
;;                    {:compiled-patterns
;;                        {:namespaces
;;                            #{#"bar|bar\. .*" #"foo|foo\. .*"}},
;;                    :patterns
;;                        {:namaspaces
;;                            #{"foo" "bar"}}},
;;                "read"
;;                    {:compiled-patterns
```

TABLE 2-continued

```
;;              {:namespaces
;;                 #{#"quux.foo.bar|quux.foo.bar\. .*"
;;                   #"quux.foo.baz|quux.foo.baz\. .*"
;;                   #"foo|foo\. .*"
;;                   #"bar|bar\. .*"
;;                   #"baz|baz\. .*"}
;;              :labels
;;                 #{#"blargh|blargh\. .*"}},
;;              :patterns
;;                 {:namespaces
;;                    #{"foo"
;;                      "bar"
;;                      "quux.foo.bar"
;;                      "quux.foo.baz"},
;;                  :labels
;;                     #{"blargh"}},
;;              :name "test-rule-1"},
;;           "*"
;;           {:permissions
;;              {"read"
;;                 {:compiled-patterns #{#"global|global\. .*"},
;;                  :patterns #{"global"}}},
;;              :name "global-permissions"}},
;;           :definitions {all-actions ["read" "write"
"schema admin"]}}
```

In Table 2, everything inside of the curly brackets "{ }" comprises a hash map. Every rule in Table 1 is optimized within Table 2. For example, as described previously, under "test-rule-1," the entity with asset-id "1234" can perform read actions on attributes that are part of namespaces "baz," "guux.foo.bar," and "guux.foo.baz." Looking at Table 2, we can see that a lookup in the nested hash map for ("1234," "read") returns the expected namespaces of "baz," "guux.foo.bar," and "guux.foo.baz," as well as "foo" and "bar" on which it can perform all-actions.

In the example above, you will note that the compiled-patterns include regular expressions. For example, the policy grants read writes to all attributes in the "baz" namespace. The compiled pattern that is included in the hash map is "baz|baz\. . * ." Also note that the hash map includes patterns that are not compiled, which are used in the reverse lookup context described below.

Finally, the system stores, at the node, the optimized data structure in memory to facilitate subsequent local lookups of permissions associated with the attributes and the resources. Thus, when access to a resource is requested at the local node, and the rights have to be determined, the local node can simply perform a lookup in the hash map in resident memory. This eliminates the additional network traffic and the cost of serializing and deserializing the request if the local node had to send the request to an access control server.

Note that the examples above have asked for permissions with questions in the form of "can client c perform operation x with resource y?" This works much of the time, but is rather in efficient if requests keep coming in for the same client performing the same operation on different resources within different namespaces. In this example, each request would cause the system to perform an additional lookup in the hash map.

One way to eliminate these subsequent lookups in this example is to ask the question in the form of "what resources y can client c perform operation x?" For example, when considering the file in Table 2, if the system received a request to determine if client "1234" has "read" access to "foo.b," the system would have to perform the lookup even if it had just determined that client "1234" has "read" access to "foo.a." Rather than looking up each of these requests individually, the system instead can essentially ask what resources does "client 1234" have "read" access for by performing a lookup on the hash map for ("1234," "read") which returns the uncompiled patterns "foo," "bar," "baz," "guux.foo.bar," and "guux.foo.baz." These patterns can be stored in memory such that subsequent read requests for client "1234" for resources that are part of those name spaces do not cause subsequent lookups. In addition, these "reverse lookups" return "labels" in addition to "namespaces," wherein, as described above, the "labels" refer to "edges" in the node graph.

In some embodiments of the present invention, this lookup service can be implemented as a rest API that is available to other resources on the network. Furthermore, in addition to controlling access to resources, the system may also use the same policy infrastructure to control access to features in a search engine or any other service.

Figure 2:
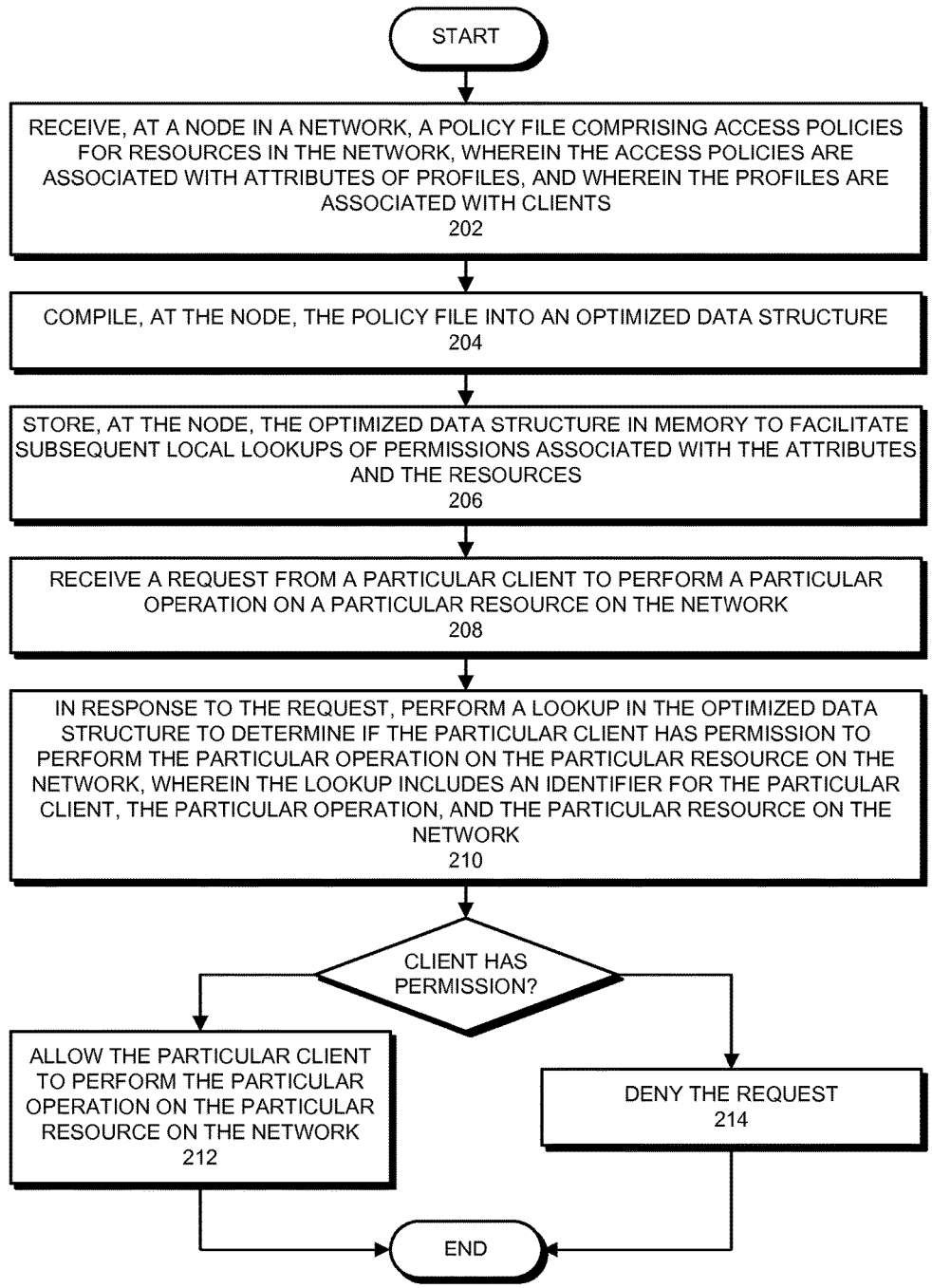
FIG. 2 presents a flow chart illustrating the process of distributing an access control service to local nodes in accordance with an embodiment of the present invention.

FIG. 2 presents a flow chart illustrating the process of distributing an access control service to local nodes in accordance with an embodiment of the present invention. During operation, the system receives, at a node in a network, a policy file comprising access policies for resources in the network, wherein the access policies are associated with attributes of profiles, and wherein the profiles are associated with clients (operation 202). Next, the system compiles, at the node, the policy file into an optimized data structure (operation 204). Note that, as described previously, this optimized data structure may be a nested hash map; however, other optimized data structures may also be utilized. The system then stores, at the node, the optimized data structure in memory to facilitate subsequent local lookups of permissions associated with the attributes and the resources (operation 206).

At some subsequent point in time, the system receives a request from a particular client to perform a particular operation on a particular resource on the network (operation 208). In response to the request, the system performs a lookup in the optimized data structure to determine if the particular client has permission to perform the particular operation on the particular resource on the network, wherein the lookup includes an identifier for the particular client, the particular operation, and the particular resource on the network (operation 210). If so, the system allows the particular client to perform the particular operation on the particular resource on the network (operation 212). However, if not, the system denies the request (operation 214).

Figure 3:
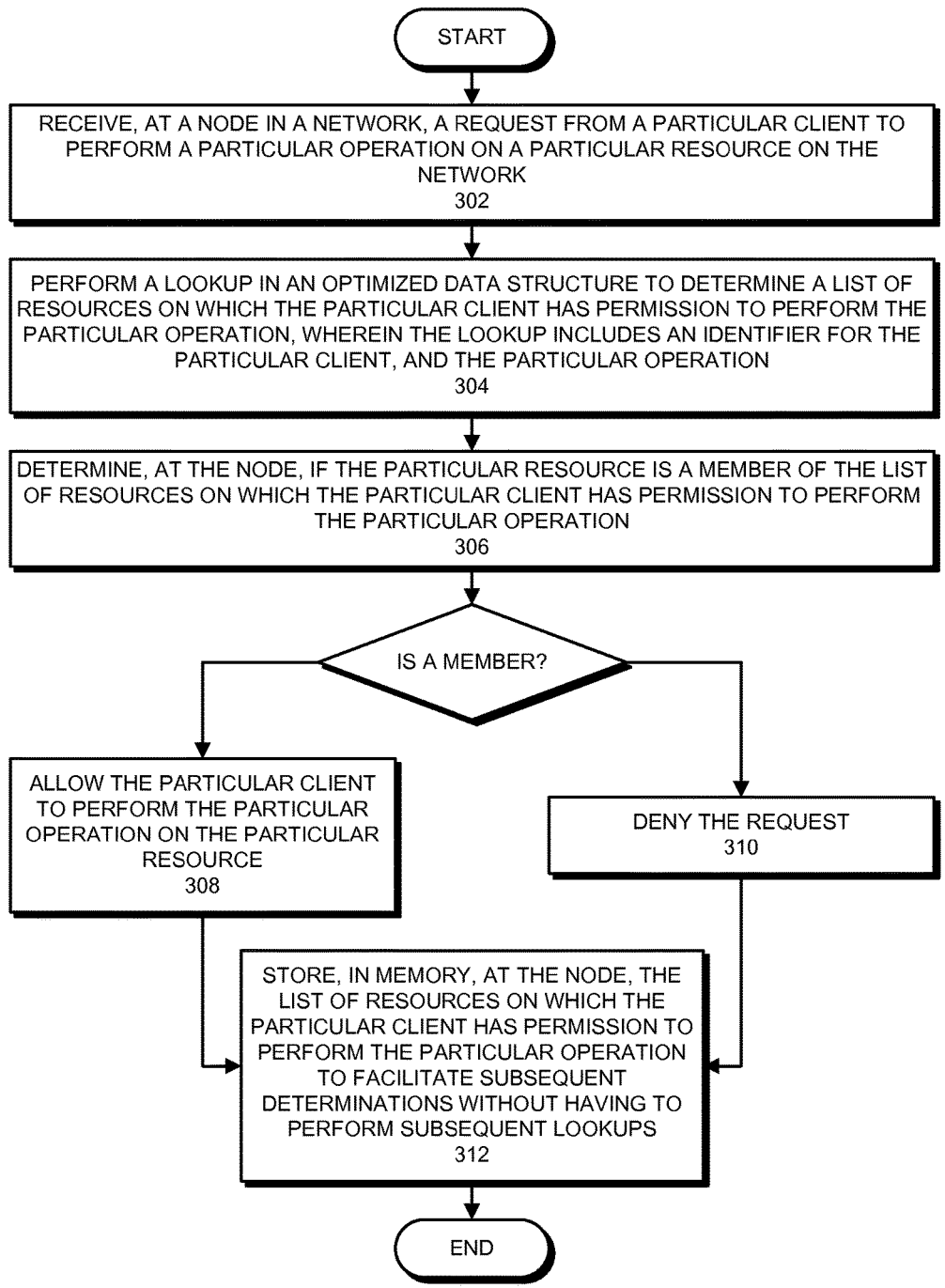
FIG. 3 presents a flow chart illustrating the process of performing a reverse lookup in accordance with an embodiment of the present invention.

FIG. 3 presents a flow chart illustrating the process of performing a reverse lookup in accordance with an embodiment of the present invention. During operation, the system receives, at a node in a network, a request from a particular client to perform a particular operation on a particular resource on the network (operation 302). In response to the request, the system performs a lookup in an optimized data structure to determine a list of resources on which the particular client has permission to perform the particular operation, wherein the lookup includes an identifier for the particular client, and the particular operation (operation 304). The system then determines, at the node, if the particular resource is a member of the list of resources on which the particular client has permission to perform the particular operation (operation 306). If so, the system allows the particular client to perform the particular operation on the particular resource (operation 308). If not, the system denies the request (operation 310). Finally, the system stores in memory, at the node, the list of resources on which the particular client has permission to perform the particular operation to facilitate subsequent determinations without having to perform subsequent lookups (operation 312).

Figure 4:
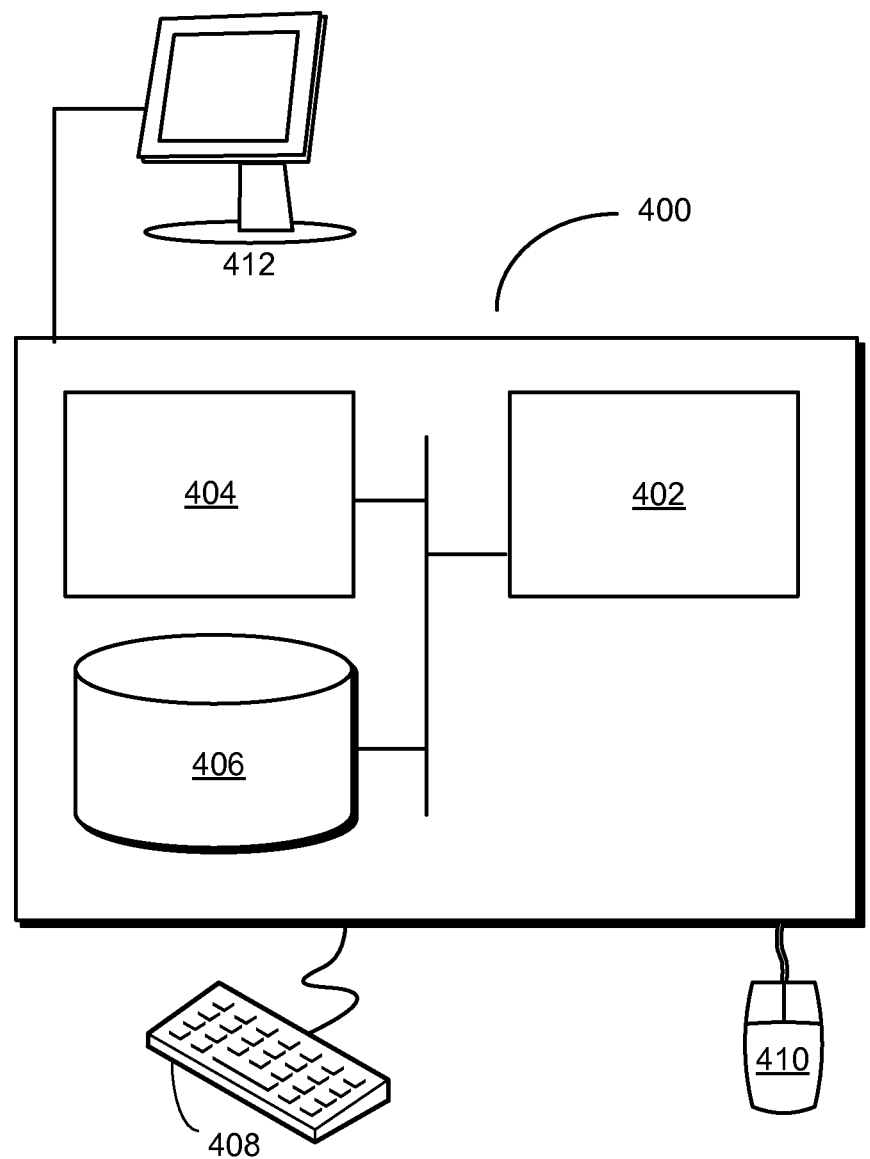
FIG. 4 shows a computer system in accordance with an embodiment of the present invention.

FIG. 4 shows a computer system 400 in accordance with an embodiment of the present invention. Computer system 400 may correspond to an apparatus that includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for distributing an access control service to local nodes. In addition, one or more components of computer system 400 may be remotely located and connected to the other components over a network. Portions of the present embodiments may also be located on different nodes of a distributed system that implements the embodiments.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for distributing an access control service to local nodes, the method comprising:
   receiving, at a local node in a network from a policy server, a policy file comprising access policies for resources in the network, wherein the access policies are associated with attributes of profiles, the profiles are associated with clients and relationships between clients are associated with edges in a node graph;
   generating, at the local node, a nested hash map based on the policy file comprising a set of labels associated with the edges in the node graph;
   receiving, at the local node, a request for a client to perform an operation on a resource of a resource namespace on the network;
   determining, by performing a lookup in the nested hash map at the local node, a plurality of namespaces in which the client may perform the operation;
   determining the resource namespace is within the plurality of namespaces the client may perform the operation in;
   allowing, at the local node, access to the resource;
   storing, at the local node, the nested hash map in memory to facilitate subsequent local lookups of permissions associated with the attributes and the resources; and
   storing, at the local node, the plurality of namespaces to facilitate subsequent lookups of namespaces in the plurality of namespaces.

2. The computer-implemented method of claim 1, further comprising:
   receiving a request from a second client to perform a second operation on a second resource on the network;
   in response to the request, performing a lookup in the nested hash map to determine if the second client has permission to perform the second operation on the second resource on the network, wherein the lookup includes an identifier for the second client, the second operation, and the second resource on the network;
   if the second client has permission to perform the second operation on the second resource, allowing the second client to perform the second operation on the second resource on the network; and
   if the second client does not have permission to perform the second operation on the second resource, denying the request.

3. The computer-implemented method of claim 1, further comprising:
   receiving, at the node in a network, a second policy file;
   compiling, at the node, the second policy file into a second nested hash map;
   storing, at the node, the second nested hash map in memory; and
   automatically swapping the nested hash map with the second nested hash map.

4. The computer-implemented method of claim 3, wherein the second policy file is received at the node on a pre-determined schedule.

5. The computer-implemented method of claim 3, wherein the second policy file is received at the node in response to a request for a new policy file from the node.

6. The computer-implemented method of claim 3, wherein the second policy file is received at the node after a pre-determined amount of time.

7. The computer-implemented method of claim 1, wherein the client is one of an application and an end-user.

8. The computer-implemented method of claim 1, wherein the attributes are associated with edges in a node graph.

9. The method of claim 1, further comprising:
   receiving a subsequent request from the client to perform the operation on a different resource; and
   performing, at the local node, a lookup for the subsequent request using the set of namespaces.

10. A non-transitory computer-readable storage medium storing instructions that when executed by a computer cause the computer to perform a method for distributing an access control service to local nodes, the method comprising:
    receiving, at a local node in a network from a policy server, a policy file comprising access policies for resources in the network, wherein the access policies are associated with attributes of profiles, the profiles are associated with clients and relationships between clients are associated with edges in a node graph;
    generating, at the local node, a nested hash map based on the policy file comprising a set of labels associated with the edges in the node graph;
    receiving, at the local node, a request for a client to perform an operation on a resource of a resource namespace on the network;
    determining, by performing a lookup in the nested hash map at the local node, a plurality of namespace in which the client may perform the operation
    determining the resource namespace is within the plurality of namespaces the client may perform the operation in;

allowing, at the local node, access to the resource;
storing, at the local node, the nested hash map in memory to facilitate subsequent local lookups of permissions associated with the attributes and the resources; and
storing, at the local node, the plurality of namespaces to facilitate subsequent lookups of namespaces in the plurality of namespaces.

11. The non-transitory computer-readable storage medium of claim 10, wherein the method further comprises:
receiving a request from a second client to perform a second operation on a second resource on the network;
in response to the request, performing a lookup in the nested hash map to determine if the second client has permission to perform the second operation on the second resource on the network, wherein the lookup includes an identifier for the second client, the second operation, and the second resource on the network;
if the second client has permission to perform the second operation on the second resource, allowing the second client to perform the second operation on the second resource on the network; and
if the second client does not have permission to perform the second operation on the second resource, denying the request.

12. The non-transitory computer-readable storage medium of claim 10, wherein the method further comprises:
receiving, at the node in a network, a second policy file;
compiling, at the node, the second policy file into a second nested hash map;
storing, at the node, the second nest hash map in memory; and
automatically swapping the nested hash map with the second nested hash map.

13. The non-transitory computer-readable storage medium of claim 12, wherein the second policy file is received at the node on a pre-determined schedule.

14. The non-transitory computer-readable storage medium of claim 12, wherein the second policy file is received at the node in response to a request for a new policy file from the node.

15. The non-transitory computer-readable storage medium of claim 12, wherein the second policy file is received at the node after a pre-determined amount of time.

16. The non-transitory computer-readable storage medium of claim 10, wherein the client is one of an application and an end-user.

17. The non-transitory computer-readable storage medium of claim 10, wherein the attributes are associated with edges in a node graph.

18. The non-transitory computer-readable medium of claim 10, the method further comprising:
receiving a subsequent request from the client to perform the operation on a different resource; and
performing, at the local node, a lookup for the subsequent request using the set of namespaces.

19. An apparatus configured to perform a method for distributing an access control service to local nodes, comprising:
a memory;
one or more processors; and
a non-transitory computer-readable storage medium storing instructions that when executed by the one or more processors cause the apparatus to perform a method comprising:
receiving, at a local node in a network from a policy server, a policy file comprising access policies for resources in the network, wherein the access policies are associated with attributes of profiles, the profiles are associated with clients and relationships between clients are associated with edges in a node graph;
generating, at the local node, a nested hash map based on the policy file comprising a set of labels associated with the edges in the node graph;
receiving, at the local node, a request for a client to perform an operation on a resource of a resource namespace on the network;
determining, by performing a lookup in the nested hash map at the local node, a plurality of namespaces in which the client may perform the operation;
determining the resource namespace is within the plurality of namespaces the client may perform the operation in;
allowing, at the local node, access to the resource;
storing, at the local node, the nested hash map in memory to facilitate subsequent local lookups of permissions associated with the attributes and the resources; and
storing, at the local node, the nested hash map in memory to facilitate subsequent lookups of namespaces in the plurality of namespaces.

20. The apparatus of claim 19, the method further comprising:
receiving a subsequent request from the client to perform the operation on a different resource; and
performing, at the local node, a lookup for the subsequent request using the set of namespaces.

* * * * *